(12) United States Patent
Parkinson et al.

(10) Patent No.: US 8,112,624 B2
(45) Date of Patent: Feb. 7, 2012

(54) METHOD AND SYSTEM FOR CERTIFICATE REVOCATION LIST COMPRESSION

(75) Inventors: Steven William Parkinson, Mountain View, CA (US); Chandrasekar Kannan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 822 days.

(21) Appl. No.: 11/564,623

(22) Filed: Nov. 29, 2006

(65) Prior Publication Data

US 2008/0126378 A1 May 29, 2008

(51) Int. Cl.
*H04L 29/00* (2006.01)
*H04L 9/32* (2006.01)

(52) U.S. Cl. ............ 713/158; 713/156; 726/10; 726/18; 709/247

(58) Field of Classification Search .................. 707/101; 709/247; 726/10, 18; 713/156–158
See application file for complete search history.

(56) References Cited

U.S. PATENT DOCUMENTS

| | | | | |
|---|---|---|---|---|
| 5,682,441 | A * | 10/1997 | Ligtenberg et al. | 382/232 |
| 5,793,868 | A * | 8/1998 | Micali | 380/28 |
| 6,487,658 | B1 | 11/2002 | Micali | |
| 6,604,106 | B1 * | 8/2003 | Bodin et al. | 707/101 |
| 2005/0073579 | A1 * | 4/2005 | Lepine et al. | 348/100 |
| 2005/0120207 | A1 | 6/2005 | Hines et al. | |

OTHER PUBLICATIONS

RFC 3280: Internet X.509 Public Key Infrastructure Certificate and Certificate Revocation List (CRL) Profile, by Housley, et. al.*
lossless compression, huffman coding, lempel-ziv. In Microsoft Computer Dictionary. Microsoft Press 2002.*
Årnes, André, "Public Key Certificate Revocation Schemes," Thesis for Department of Telematics, Norwegian University of Science and Technology, Queen's University Kingston Ontario, Canada Feb. 2000.

* cited by examiner

*Primary Examiner* — Kambiz Zand
*Assistant Examiner* — Imhotep Durham
(74) *Attorney, Agent, or Firm* — Lowenstein Sandler PC

(57) ABSTRACT

Embodiments of the present invention provide a compression capability for compressing a CRL, such as an X.509 CRL, stored as a file, data structure or data object in a computer system having a certification authority (CA) and a security client. An exemplary method provides for accessing the CRL contents including a certificate revocation record and performing compression procedure, such as a lossless compression procedure on the contents of the CRL. The compressed CRL contents can be stored in another file, data structure or data object. A request for the compressed CRL is from a security client whereupon the compressed CRL is returned to the security client by transferring the compressed CRL contents to the security client. The security can client un-compress the compressed CRL contents. In some cases the uncompressed CRL contents can be transferred to the security client. The compression procedure can further compress a body portion of the CRL and modify a header portion of the CRL to indicate that the body portion is compressed. The security client can read the header portion to determine that the CRL is compressed and can un-compresses the CRL.

29 Claims, 8 Drawing Sheets

METHOD AND SYSTEM FOR CERTIFICATE REVOCATION LIST COMPRESSION

DESCRIPTION OF THE INVENTION

1. Field of the Invention

The present invention relates generally to security in complex heterogeneous processing environments and more particularly, to providing a compressed certificate revocation list (CRL) in a public key infrastructure (PKI) environment.

2. Background of the Invention

In computer network environments, security systems based on PKI are gaining popularity as a way of providing security or enhancing existing security, particularly with regard to security for network connections. Generally speaking, a PKI is an arrangement of servers, clients, and specific information that passes between them, for the verification of user identities by one or more trusted third parties such as, for example, one or more Certification Authorities (CA). The specific information is referred to as a public key and is typically associated with or bound to a particular user or users.

The establishment of a public key is typically accomplished by security or PKI software executing at a central location, such as a server, and operating in a coordinated or sometimes uncoordinated fashion with software at client locations. The public keys are typically provided within security certificates specified under, for example, the PKI Working Group (PKIX) of the Internet Engineering Task Force (IETF), which implement certificate standards based on the International Telecommunication Union-Telecommunication Standardization Sector (ITU-T) Recommendation X.509 ITU-T Recommendation X.509 (1997 E): Information Technology-Open Systems Interconnection—The Directory: Authentication Framework, June 1997 also specified in Comité Consultatif International Téléphonique et Télégraphique (CCITT), Geneva, 1989, Date Communication Networks: Directory, Recommendation X.500-X.521, Blue Book, Volume VIII-Fascicle VII.8 and International Standards Organization/International Engineering Consortium (ISO/IFC), 25 Dec. 1991, Information Technology-Open Systems Interconnection—The Directory: Authentication Framework, ISO/TEC 9594-8 (CCITT Recommendation X.509). The PKIX further specifies additional aspects in connection with request for comments (RFC) 3280, Housley, R., et al., "Internet X.509 Public Key Infrastructure: Certificate and Certificate Revocation List (CRL) Profile", RFC 3280, April 2002 (supersedes RFC 2459).

Using a PKL network communications between, for example, a server and a client can be protected such as with a secure socket layer (SSL) connection between the server and client. Originally, SSL was privately developed as a way to provide a secure connection between an Internet web server and a browser operating on a client and has now been adopted as an open security standard by IETF. To operate in a PKI environment, a server wishing to communicate with a client or other network nodes needs to obtain a certificate for validating its identity to the client or other nodes and for allowing an encryption key to be generated for the establishment of the SSL connection. When the client and server first make a connection, the certificate is received by the client and the issuing CA is compared with a root CA certificate stored locally on the client. If the root CA matches the issuing CA then the certificate can be considered trusted. Otherwise a notification can be provided to the client that additional verification steps should be taken to ensure that the server can be "trusted."

A typical certificate contains the name of the server or other entity that is being identified, the server's public key, the name of the issuing CA, and other information including validity dates and cryptographic information proving that the certificate is authentic, and the serial number of the certificate. Over time, it will be appreciated that the security environment can change, and as different servers are encountered and respective certificates are accumulated, the need may arise to notify a client that a certificate is no longer valid and has been revoked. Since certificates are issued in an open ended fashion, that is once the certificates are generated, the client will have continued possession of the certificate, a separate notification must be provided that indicates the current status of the certificates issues by a particular issuing authority or CA. Such a notification is referred to as a certificate revocation list (CRL).

To further facilitate security, the CA periodically issues the CRL, which contains a list of revoked certificates and other information, such as information regarding the date the CRL was generated and the date of the next update for the CRL. The contents of the CRL and management of the CRL is specified in X.509 and RFC 3280, for example, as noted above. In some cases the contents of the CRL can include various extensions for providing additional information including reasons for revocation and the like. Depending on the scale of operation for a particular client the number of certificate handled can be large and, depending on the number of extensions in use, the size of each CRL entry with extension can be large.

Difficulties arise when large numbers of entries associated with revoked certificates including: information associated with extensions, are included in a CRL, which must be transferred to a client or other entity or a series of clients or entities. As updates are generated more frequently, the bandwidth requirements associated with transferring the CRL over the communication channel between the server and the client become increasingly large. One approach is to issue and transfer a so-called delta CRL, that is, a CRL containing information associated with certificates that have been revoked since the issuance of the last CRL. The delta CRL and the base CRL together provide comprehensive information regarding certificate revocation status. Such a system is described in U.S. Patent Application Publication No. US 2005/0120207 A1.

In other systems, such as those described in "Public Key Revocation Schemes," Ärnes, Queen's University, Kingston, Ontario, Canada, February 2000, and U.S. Pat. No. 6,487,658, "EFFICIENT CERTIFICATE REVOCATION," issued on Nov. 26, 2002 Micali, portions of information associated with a certificate in a CRL, such as a date field, are encoded or in some cases compressed to reduce the size of the field marginally reducing the number of bits needed to represent the field data. Further, the CRL is segregated or segmented such that information regarding certificates associated with a specific distribution point can be separately requested and provided. Aside from these minimal measures, Micali abandons the traditional CRL in favor of alternative constructs based on individual queries to the CA.

Problems arise with such systems in that, as the size of the CRL grows, the impact of the marginal reduction in certificate size is reduced relative to the size of the entire CRL. Further, at some point, the base CRL must be transferred and, if the number and scope of updates becomes extensive, along with the number of Delta CRLs, the management of the CRL becomes complex and, while possibly reducing bandwidth requirements for updates, consumes an increasing quantity of processing resources and an increasing quantity of time. It would be desirable therefore to provide a CRL management capability in a computer system environment that could improve PKI performance by reducing bandwidth requirements for CRL transfers.

While a general background including problems in the art are described hereinabove, with occasional reference to related art or general concepts associated with the present invention, the above description is not intending to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope of applicability of the present invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
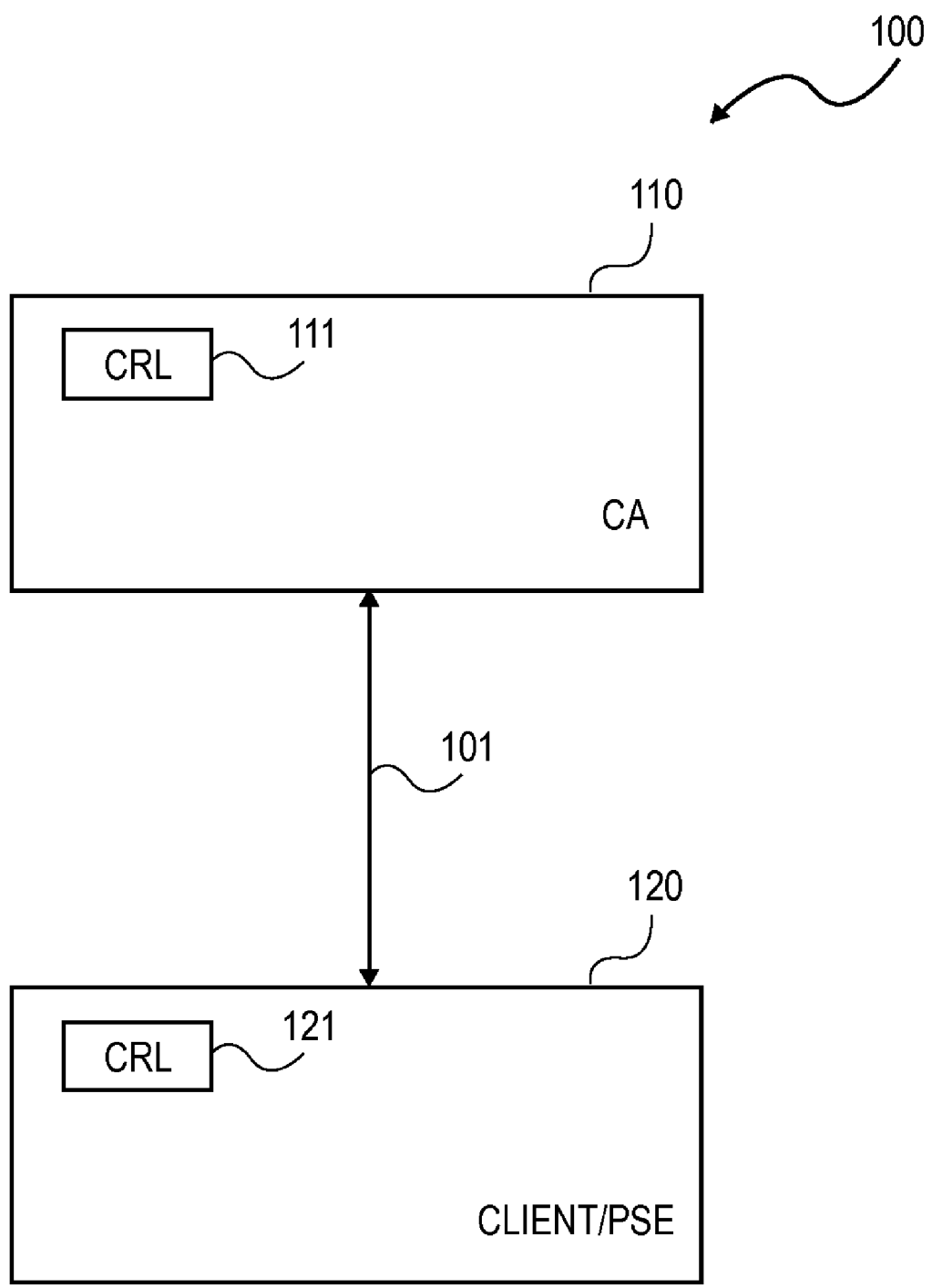
FIG. 1 is a diagram illustrating exemplary components of a computer system consistent with embodiments of the present invention.

Embodiments of the present invention provide methods and systems for compressing an entire CRL with an out-of-band indication that the CRL is compressed or for compressing CRL contents, which preferably include a sequence of compressed certificate serial numbers and optional extensions associated with revoked certificates, while maintaining an uncompressed header having information associated with the contents such as compression method, location of individual information associated with the revoked certificates within the compressed portion of the CRL, and the like.

A method of compressing a CRL can be implemented in a computer system having a CA. As will be appreciated by one of ordinary skill, the CRL is preferably stored as one or a combination of a file, a data structure or data object, or the like associated with the CA. In addition to typical contents and any extensions that may be included, the CRL also includes at least one certificate revocation record associated with a revoked certificate. In accordance with various embodiments, the exemplary method includes accessing contents associated with the CRL including the certificate revocation record, performing a compression procedure with the contents of the CRL to form compressed CRL contents, such as a compressed certificate serial numbers and optional extensions associated with revoked certificates, and storing the compressed CRL contents as one of a combination of a file, data structure, data object, or the like associated with the CA.

A request for the CRL can be received from a security client whereupon the compressed CRL can be returned to the security client by retrieving the compressed CRL contents from the file, data structure, data object or the like associated with the CA and transferring the compressed CRL to the security client thereby reducing the bandwidth demands associated with the transfer of the compressed CRL contents. The security client then un-compresses the compressed CRL contents to form an uncompressed CRL, which can then be accessed to determine the revocation status of certificates received, for example, during interaction with a network or the like.

While the CRL contents are preferably transferred compressed, it will be appreciated that in some instances, it may be beneficial to compress the CRL contents locally and transfer the contents uncompressed in the conventional fashion. In such a case, the CRL contents can be uncompressed from the file, data structure, data object or the like associated with the CA for holding the compressed contents into another file, data structure, data object or the like associated with the CA for holding the uncompressed contents to form an uncompressed CRL. The uncompressed CRL can be returned to the security client by retrieving the uncompressed CRL and transferring the uncompressed CRL to the security client.

In accordance with various embodiments, the compression procedure can include one or a combination of various procedures such as, for example, a lossless compression procedure, a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure, a Lempel-Ziv-Welch (LZW) compression procedure, or another form of lossless compression known to or developed by those of skill in the art. It will be appreciated that the lossless nature of the compression procedure ensures that the certificate information will not be compromised or corrupted by information loss associated with the compression procedure.

In some embodiments, the CRL includes a header portion and a body portion, with the certificate revocation record included in the body portion. In such cases, the compression procedure includes compressing the body portion, and modifying the header portion to indicate that the body portion is compressed. The compressed body portion includes compressed CRL contents such as, for example, a compressed certificate serial numbers and optional extensions associated with revoked certificates. In response to a request for the CRL received from a security client, the compressed CRL is returned to the security client by retrieving the compressed CRL contents from the file, data structure, data object or the like associated with the CA and transferring the compressed CRL to the security client. The security client can then read the header portion to determine that the requested CRL is the compressed CRL and uncompresses the compressed CRL to form an uncompressed CRL, for example by decompressing information associated with individual certificates in the sequence of compressed serial numbers or other information or uncompressing some or all of the certificate serial numbers and other information in the sequence.

It will be appreciated that the certificate revocation record includes a serial number of the revoked certificate, a reason for suspension, and an invalidity date. The revoked certificate can also include a certificate extension including one of an authority key identifier, an issuer alternative name, a certificate issuer or other extensions. The CRL can include fields such as a version field, a CRL number field, an issuing distribution point field, a delta CRL indicator field, a reason code field, a signature field, an issuer field, an present update date field, a next update date field, an extension field and a certificate revocation record field. Thus, in accordance with various embodiments, when referring to a CRL, a base CRL or a delta CRL can be included. Further, the CRL and revoked certificate or certificates can be of the kind specified under X.509.

The methods discussed and described herein can be implemented in a number of different manners. For example, an apparatus can be configured to perform the exemplary method, or a computer readable medium including computer executable instructions for causing a computer, processor, controller or the like, to perform the method can be used.

In accordance with other exemplary embodiments, a method of processing a compressed certificate revocation list (CRL) can be implemented in a computer system having a CA, where the compressed CRL is stored as one or a combination of a file, data structure, a data object or the like associated with the CA. The compressed CRL preferably has at least one certificate revocation record including a serial number of a revoked certificate and is compressed according to a compression procedure.

Accordingly the compressed CRL can be received in a security client. The contents of the compressed CRL including the at least one certificate revocation record are accessed in the security client. An un-compression procedure is performed on the contents of the CRL to form un-compressed CRL contents, and the un-compressed CRL contents are stored in the security client in a file, a data structure or a data object associated with the security client.

It will be appreciated that, as described above, the compression procedure can include one or a combination of various procedures such as, for example, a lossless compression procedure, a Burrows-Wheeler block sorting compression procedure, a Huffman coding compression procedure, an arithmetic coding compression procedure, a sliding window compression procedure, a Lempel-Ziv (LZ77) compression procedure, a Lempel-Ziv 1978 (LZ78) compression procedure, a Lempel-Ziv-Welch (LZW) compression procedure, or another form of lossless compression known to or developed by those of skill in the art. The CRL and revoked certificate or certificates can be of the kind specified under X.509.

In still other embodiments, a certificate server can be configured to compress a certificate revocation list (CRL) in a computer system having, for example, a CA. Alternatively the certificate server and the CA can be one in the same. The CRL preferably has at least one certificate revocation record associated with a revoked certificate. The exemplary certificate server includes a secure network interface such as a software oriented secure connection, a hardware oriented secure connection with an operating system interface or a combination of hardware and software. The exemplary certificate server further includes a storage device for storing the CRL as one or a combination of a file, a data structure or a data object associated with the CA, and a processor coupled to the storage device and the secure network interface such as through a port, bus or the like. The processor can be configured to access the contents of the CRL, activate a compression procedure to compress the contents of the CRL to form compressed CRL contents, and store the compressed CRL contents in one or a combination of a file, a data structure and a data object associated with the CA.

The processor can be further configured to receive a request for the CRL over the secure network interface from a security client, uncompress the CRL contents from one of the file, data structure or data object associated with the CA into the other of the file and the data object associated with the CA to form an uncompressed CRL. The processor can then return the uncompressed CRL to the security client by retrieving the uncompressed CRL from the first one of the file and the data object associated with the CA and transferring the uncompressed CRL to the security client over the secure network interface. The processor can still further be configured to receive a request for the compressed CRL over the secure network interface from a security client, and return the compressed CRL to the security client by retrieving the compressed CRL contents from the file, data structure or data object associated with the CA and transferring the compressed CRL to the security client over the secure network interface. The security client can then un-compress the compressed CRL contents to form an uncompressed CRL, which can then be accessed in the normal manner.

It should be noted that the compression procedure can include one or a combination of various procedures such as, for example, a lossless compression procedure, a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure, a Lempel-Ziv-Welch (LZW) compression procedure, or another form of lossless compression known to or developed by those of skill in the art. It will be appreciated that the lossless nature of the compression procedure ensures that the certificate information will not be compromised or corrupted by information loss associated with the compression procedure.

As in other embodiments, the certificate revocation record includes information such as, for example, a serial number of the revoked certificate, a reason for suspension, and an invalidity date. Further, the revoked certificate can include one or more certificate extension including an authority key identifier, an issuer alternative name, a certificate issuer and the like. The CRL can include one or more fields including a version field, a CRL number field, an issuing distribution point field, a delta CRL indicator field, a reason code field, a signature field, an issuer field, an present update date field, a next update date field, and a certificate revocation record field. The CRL and revoked certificate or certificates can be of the kind specified under X.509.

In still other embodiments, a security client can be configured for processing a compressed CRL in a computer system including at least a CA. The compressed CRL is preferably stored in the CA as one or a combination of a file, a data structure or a date object associated with the CA. The compressed CRL can be associated with CRL having at least one certificate revocation record associated with a revoked certificate. The exemplary security client can include a network interface for connecting to a public or private network in a wired or wireless manner as would be appreciated by one of ordinary skill, a storage device such as an electronic or electro-mechanical device or drive, and a security client processor coupled to the storage device and the network interface. In accordance with various embodiments, the security processor can be configured to download the compressed CRL from the CA, access the contents of the compressed CRL, perform an un-compression procedure on the contents of the compressed CRL to form un-compressed CRL contents, and store the un-compressed CRL contents in the storage device as a file, a data structure or a data object associated with the security client. It will be appreciated that the un-compression procedure is a reverse procedure of the compression procedure used to produce the compressed CRL and the compressed CRL contents can include, for example, a compressed certificate serial numbers and optional extensions associated with revoked certificates.

In connection with the exemplary security client, the compression procedure includes one or more of a lossless compression procedure, a Burrows-Wheeler block sorting compression procedure, a Huffman coding compression procedure, an arithmetic coding compression procedure, a sliding window compression procedure, a Lempel-Ziv 1977 (LZ77) compression procedure and a Lempel-Ziv 1978 (LZ78) compression procedure, Lempel-Ziv-Welch (LZW) compression procedure. The certificate can further include one or more certificate extensions such as an authority key identifier, an issuer alternative name, a CRL number, an issuing distribution point, a delta CRL indicator, a reason code, a certificate issuer, a reason for suspension, an invalidity date and the like. Further, the CRL can include one or more fields such as a version field, a signature field, an issuer field, a present update date field, a next update date field, and a revoked certificates field. The CRL and revoked certificate or certificates can be of the kind specified under X.509.

Reference will now be made in detail to exemplary embodiments of the invention, which are illustrated in the accompanying drawings. Wherever possible, the same reference numbers will be used throughout the drawings to refer to the same or like parts.

Referring now to FIG. 1, a simplified and representative PKI environment 100 associated with a computer system will be discussed and described. The basic representative environment includes a certification authority (CA) 110, which will also be referred to herein as a server or certificate server or will be referred to as working in connection with a server or certificate server, and also includes a security client 120, which can also be referred to as a personal security environment (PSE). It will be appreciated that the CA 110 and the security client 120 can be of the kind specified under X.509 as cited above, or can be of another type provided that they use certificates, CRLs and the like. In a typical interaction between the CA 110 and the security client 120, a new version of a CRL, such as CRL 111 and will be generated during operation, such as after a certain number of new certificates are generated, and will be transferred to the security client 120 over a network connection 101 where it can be stored, for example, as CRL 121.

It will be appreciated that the transfer of the CRL 111 can include a streaming transfer of the contents of CRL 111, which could include a data structure or data object, a direct transfer of a file, a block transfer of the CRL contents, or the like. It should be noted that in a conventional PKI environment CRL 111 and CCL 121 will generally have the same contents. However, they are referred to separately for illustrative purposes to exemplify that at least at certain times, the contents of CRL 111 will differ from CRL 121, such as before an update is transferred to the security client and to further exemplify that if CRL 111 is generated by CA 110 as streaming data, the contents are transferred and a separate data structure, data object, file or the like, will be needed, such as CRL 121, to accommodate and store the streaming content. The network connection 101 can be a wired or wireless network connection such as a connection to the Internet, private network or the like.

The CA 110 can further access information stored remotely in various external data systems (not shown) provided a proper interface exists to the external data systems that may be part of the larger PKI environment. It will be appreciated that the CA 110 may be a general purpose computer or dedicated computing platform configured to execute secure and/or unsecure (or open) applications through an operating system (not shown). The CA 110 may be implemented with general purpose server platforms as known to those skilled in the art from Intel, Advanced Micro Devices, Hewlett-Packard, and/or others or can be implemented with other custom configured server architectures. Similarly the security client 120 can include a general purpose computer or dedicated computing platform configured to execute secure and/or open applications through an operating system or can operate through an independent operating system or independent version of the operating system of CA 110. The security client 120 can include a personal computer, a workstation, or other similar computing platform.

Figure 2:
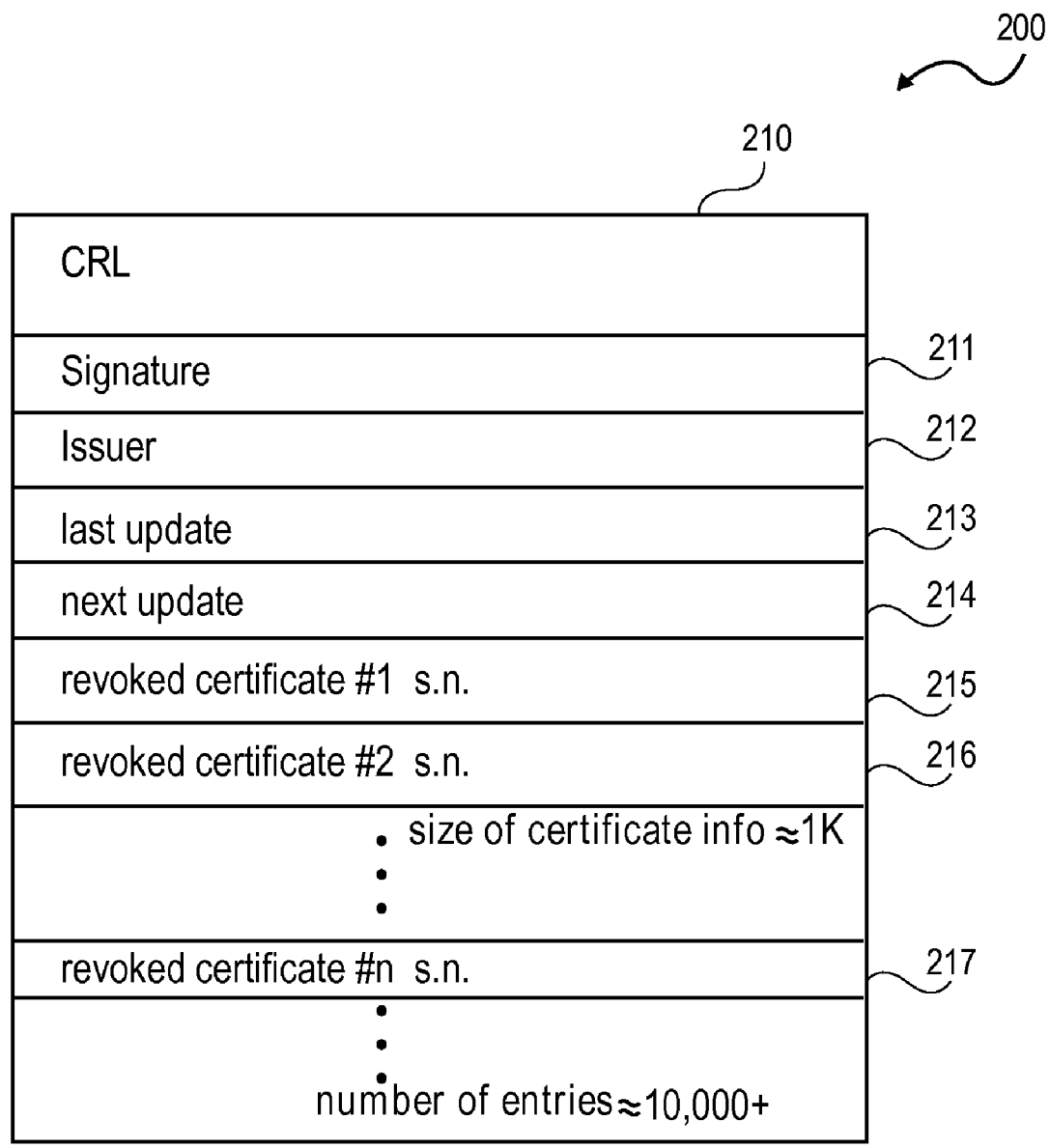
FIG. 2 is a diagram illustrating and exemplary certificate revocation list (CRL) and contents consistent with operation in accordance with the present invention.

A typical CRL, such as CRL 111 and CRL 112, described in connection with FIG. 1 is shown and described in greater detail in connection with FIG. 2. In exemplary environment 200, a CRL 210 as shown and illustrated with it typical contents. The CRL 210 typically includes a digital signature 211 of an issuer identified as an issuer 212, and additional information as will be described. The CRL 210 contains a list of serial numbers associated with revoked certificates such as revoked certificate serial number 1 215, revoked certificate serial number 2 216 through revoked certificate serial number n 217. The revoked certificates are no longer valid, and should not be relied upon by, for example, security client 120. It should be noted that in accordance with in RFC 3280, different revocation reasons are defined. For example, a certificate can be irreversibly revoked if the issuing CA improperly issued the certificate or a private key associated with the certificate or the entity associated with the certificate is thought to have been compromised. A certificate may also be revoked if the corresponding CA is determined to have failed to comply with, for example, policy requirements such as publication of fraudulent or malicious information or code, misrepresentation, or other violation as determined by the CA, a service provider or operator associated with the corresponding CA or its customer. It will be appreciated that a common reason for revocation is compromise of a private key such as when a token, smart card or the like containing the private key has been lost or stolen.

A certificate can be temporarily and reversibly invalidated, such as when a user is uncertain and suspects that the private key has been lost, such as in the case where a card or token has been misplaced. If the card or token having the private key is located and it is determined that the private key has not been compromised, the certificate can be reinstated, and the certificate will be removed from subsequent CRLs issued by the CA.

The CRL 210 further contains a last update field 213 and a next update field 214. It will be appreciated that CRL 210 can be generated periodically after the expiration of a time period or at a particular time, which will be reflected in the value associated with the next update field 214. CRL 210 can alternatively be generated immediately after a certificate has been revoked. It should be noted that CRL 210 will be issued by the CA issuing the certificates identified therein. During the valid timeframe specified by the last update field 213 and the next update field 214, CRL 210 can be consulted to verify a certificate associated with a node prior to connecting to the node by, for example, a PKI-enabled application executing on security client 120 or other PKI network node. To validate CRL 210 prior to relying on its contents, a separate certificate associated with its issuing CA is should be obtained. It should be noted that the use of CRLs such as CRL 210 is important since, as will be appreciated, by relying exclusively on certificate expiration dates, security problems that occur when the certificate is valid may not be immediately discovered leaving a time window during which unauthorized activity can occur. Therefore, the status of certificates is routinely checked though the use of CRLs before they can be trusted. The certificate for which CRL 210 is maintained are certificates that comply with X.509/public key standard.

To effectively operate in a PKI environment, access to the most current version of CRL 210 is required. In a typical scenario, on-line validation through network access to the CRL is used. However, the process of on-line access to CRLs operates against the self authenticating character of the certificate can involves excessive bandwidth. For example, given that the typical entry size for information associated with a certificate, such as serial number and optional extension, is around 1 Kbyte, and given that the number of entries of certificate information can exceed 10,000, a large CRL can be 10 Mbyte or larger requiring a significant amount of transfer time for a computer associated with the typical security client. Some alternatives to CRLs exist such as the on-line certificate validation protocol known as the Online Certificate Status Protocol (OCSP). OCSP has the primary benefit of requiring less network bandwidth and thus enabling real-time and near real-time checks for high volume or high value operations. However, for client requiring frequent certificate validation, OCSP can give rise to inefficiencies that would not be encountered if the client had local access to a CRL. Thus, to address bandwidth issues and other issues, the present invention involves compressing a CRL prior to transfer to reduce the amount of information and thus the bandwidth requirements for the network connection.

Figure 3:
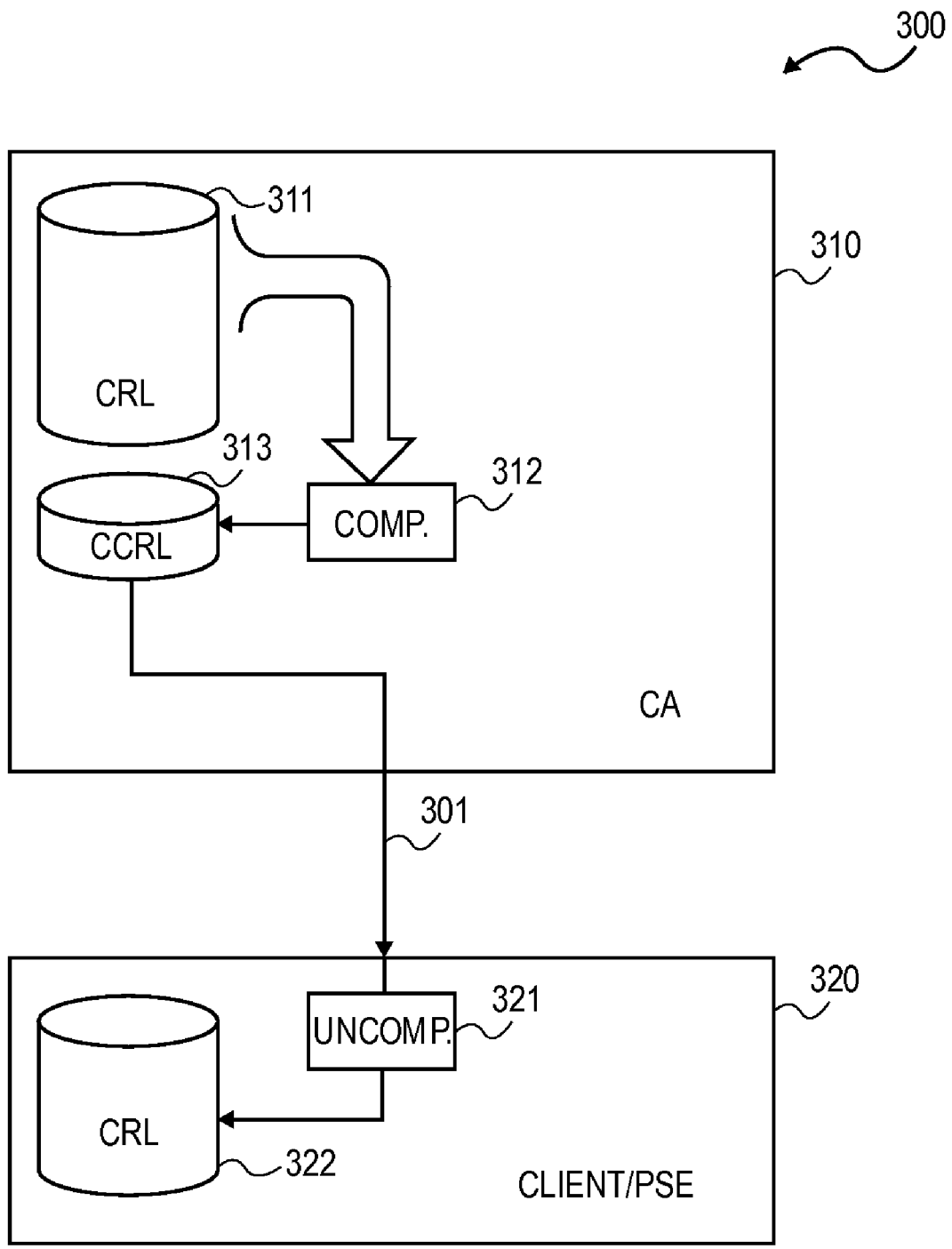
FIG. 3 is a diagram illustrating CRL compression in an exemplary certification authority (CA) and un-compression in a security client in accordance with embodiments of the present invention.

In accordance with various embodiments, an exemplary compression scenario 300 is illustrated in FIG. 3. A certificate authority (CA) 310 can include a CRL 311 having information such as revoked certificates as described, for example, in connection with FIG. 2. CA 310 further can be provided with a compression unit 312, which is shown as an element of CA 310. One of ordinary skill will appreciate that the compression unit 312 is representative of a compression procedure or a device that accomplishes compression. In some instances, the compression unit 312 can be a dedicated compression controller or the like or can be implemented in a dedicated or general purpose processor or series of processors running a corresponding compression routine or procedure. The compression unit 312, after operating on the contents of the CRL 311 can generate a compressed CRL (CCRL) 313 which can be separately stored and passed over a network connection 301 to a security client 320.

The security client 320 can be provided with a corresponding uncompression unit 321 that can perform a reverse compression operation. The uncompression unit 321 is representative of an uncompression procedure related to the compression procedure associated with compression unit 312 or can be a device that accomplishes the uncompression. In some instances, the uncompression unit 321 can be a dedicated controller or the like or can be implemented in a dedicated or general purpose processor or series of processors running a corresponding uncompression routine or procedure. The uncompression unit 321, after operating on the CCRL 313 passed over network connection 301 can generate an uncompressed CRL 322 which can be separately stored and should match the original CRL 311. It is important to note that the compression associated with compression unit 312 should be a lossless compression.

In accordance with various embodiments, the compression procedure will be a lossless compression procedure such that important information associated with the certificates and other CRL contents will not be lost or corrupted. It will be appreciated by one of ordinary skill that lossless data compression preserves the exact original data during uncompression of the compressed data. An exemplary compression procedure must use lossless compression since the original contents of the CRL and the decompressed CRL must be identical. Many lossless compression procedures are available and can be adapted for use in connection with the present Invention. For example, some image file formats such as PNG, use only lossless compression. While PNG is typically used for images, it can be used for text only as would be the case for example in compressing a CRL.

While typical compression sources include, text, images, and sound, and in general, any general-purpose lossless compression procedure can be used on any type of data, many procedures achieve significant compression based on the type of data the procedures are designed to operate on and the nature of the data itself, for example, as highly correlated or highly uncorrelated. Sound data, for example, being typically uncorrelated, is compressed poorly with conventional compression procedures oriented to text.

A typical lossless compression procedure uses two different basic approaches. In one basic approach, a statistical model for the input data is generated and in another basic approach, input data is mapped into certain bit strings such that data having a high frequency occurrence will produce shorter output than data occurring less frequently. However, it will be appreciated that in the present invention since CRL contain text data or binary data, lossless compression procedures using statistical modeling can be used. Such procedures can include for example, a Burrows-Wheeler transform, which involves block sorting or preprocessing to make compression more efficient, Lempel-Ziv (LZ) 1977 (LZ77), Lempel-Ziv 1978 (LZ78), Lempel-Ziv-Welch (LZW). Other compression procedures can include encoding algorithms to produce compact bit sequences such as Huffman coding, arithmetic coding.

In an exemplary Burroughs-Wheeler procedure, the order of the data elements in a block of data associated with the CRL is changed. If the original block of data elements of the CRL includes data elements occurring with high frequency, then the compressed block of CRL data will include several places where a single data element is repeated multiple consecutive times. By rearranging the CRL data into series of repeated data elements, subsequent compression by procedures such as move-in-front transform and run-length encoding can operated with greater ease.

The Lempel-Ziv 1977 (LZ77) compression procedure replaces portions of CRL data with references to data already having passed through both an encoder and a decoder and that matches the CRL data portions. Each reference to a match is represented by a value referred to as a length-distance pair "l-d". The length-distance reference signifies that each of the next "l" characters is equal to the character exactly "d" characters behind it in the uncompressed data. The LZ77 encoder and decoder both a block of the most recent data, such as a 2 KB, 4 KB, or 32 KB block or the like. The data is maintained in a data structure commonly referred to as a sliding window. It will be appreciated that the data structure is crucial for the encoder to look for and process matches, while the decoder interpret matches marked by the encoder. It will be appreciated that while all LZ77 procedures use the same basic principles, the encoded data output can vary widely. While the LZ77 procedure operates on data already processed, the LZ78 procedure scans the input buffer and matches data against a data dictionary. The location of the matched word in the dictionary, if one is available, can be output along with the match length. If no match is found, a length associated with the character that caused match failure is output and the unmatched word can be added to the dictionary.

In the LZW compression procedure, the data that is being compressed is used to build a string translation table mapping fixed-length codes to strings. The codes are typically 12-bits long. The string table can be filled with single-character strings during initialization. A typical table size is 256 entries in the case of 8-bit characters. During text parsing by the compression procedure, every unique two-character string can be stored in a table as a code/character. The code of code/character maps to the first character. When a string is read that has previously been encountered, the longest of any previously-encountered strings is determined, and the corresponding code is appended with the next character in the input and stored in the table. The code for the previously-encountered string is outputted and the extension character is used as the beginning of the next string. For uncompression in connection with the LZW procedure, an identical string table can be built using the compressed text as input. One of ordinary skill will appreciate that some exceptions may exist, which can easily be compensated for.

In other embodiments, Huffman coding can be used to provide a compression procedure for the CRL. Huffman coding is a lossless compression procedure and is a type of entropy encoding where a symbol such as a character is assigned a variable-length code based on the estimated probability of occurrence for each possible symbol value. Huffman coding is a prefix-free code where common characters are coded using relatively short code and less common symbols have longer ends. When the actual numeric frequencies of occurrence of symbols match the code frequencies, Huffman coding produces the smallest compressed size. In the case where the individual symbol frequencies of a set of symbols has a uniform probability distribution and a number of symbols in the set is a power of two. Huffman coding effectively reduces to simple binary block encoding.

In still other embodiments, arithmetic coding can be used as a compression procedure. Arithmetic coding is a form of entropy coding and produces a highly optimal compression result for a set of symbols and corresponding probabilities. In arithmetic coding a data model is generated such as by predicting the symbol patterns of the text to be compressed.

The choice of compression procedure can depend on consideration of the content of the data associated with the CRL. For example, unlike other forms of coding, arithmetic coding does not require an integer number of bits or encoding each source symbol and therefore generally can provide a higher compression capability. LZW coding can often be a good choice for good efficiency when the input symbols are not distributed independently in the source data, since LZW does not individually encode each input symbol. The efficiency of Huffman coding for example, depends heavily on having a good estimate of the true probability of the value of each input symbol.

Figure 4:
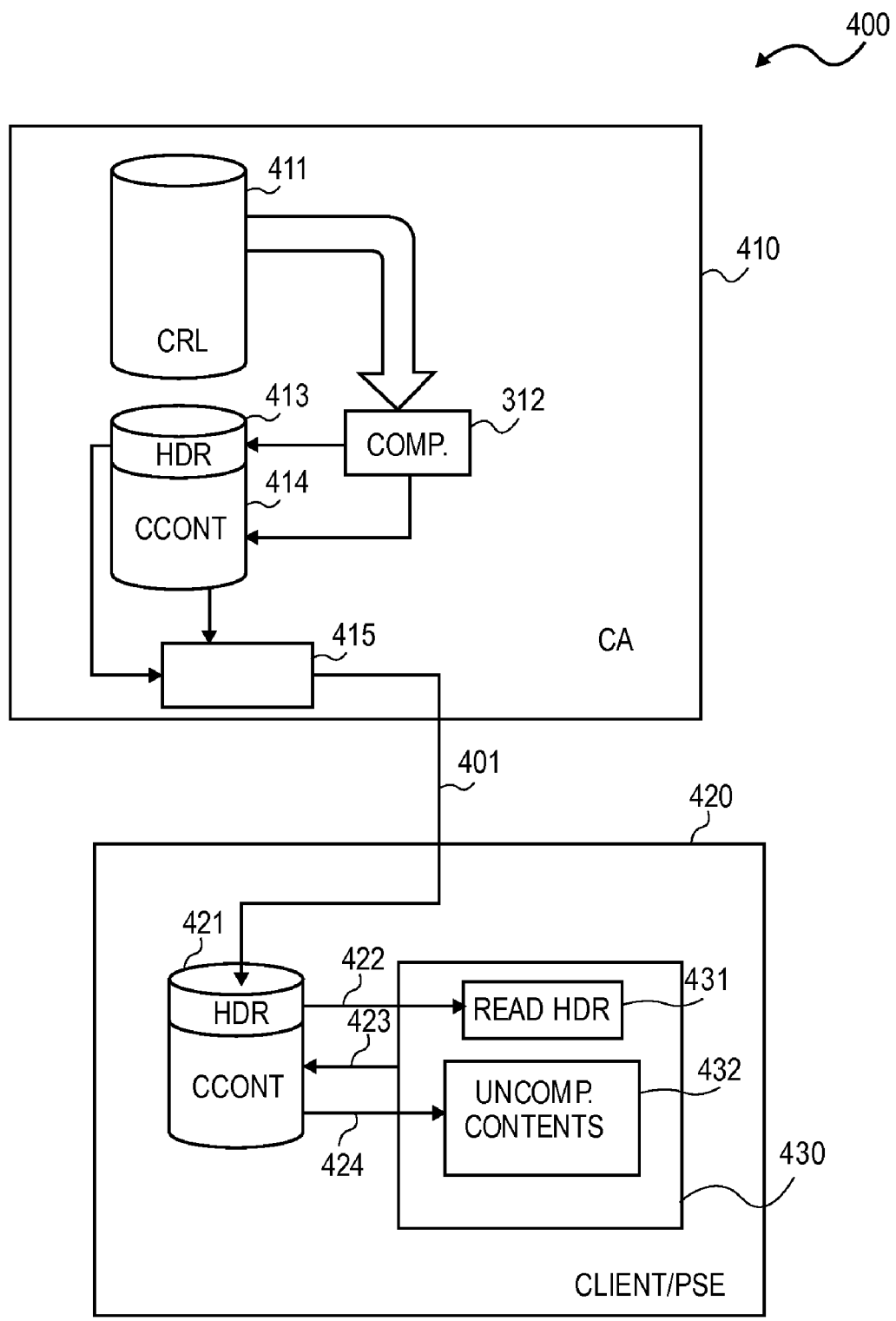
FIG. 4 is a diagram illustrating compressing CRL contents and maintaining an uncompressed header in an exemplary certification authority (CA), transfer, and un-compression of CRL contents in a security client in accordance with alternative embodiments of the present invention.

In accordance with other exemplary embodiments, scenario 400 including a CA 410 and a security client 420, as shown for example in FIG. 4, encompasses compression of CRL contents, which are preferably a compressed certificate serial numbers and optional extensions associated with revoked certificates and maintenance of a header that is uncompressed. The CA 410 can generate a CRL 411 of the kind described for example in connection with FIG. 2. The CRL 411 preferably has at least one revoked certificate including a serial number and any extension. The CRL 411 can be passed to a compression unit 312, which in the present embodiment will perform a compression on the contents of the CRL 411 and will generate an uncompressed header HDR 413 and compressed contents CCONT 414, which as noted is preferably at least one or a compressed certificate serial numbers and optional extensions associated with revoked certificate. It will be appreciated that without the HDR 413, a requesting client could not ordinarily determine that the CRL was compressed and would likely not recognize the CRL as having compressed contents CCONT 414. Therefore, the HDR 413 and the CCONT 414 can be separately processed by compression unit 312 and combined in block 415 for transfer over network connection 401 to security client 420, which as will be appreciated can be a PSE or the like. The HDR 413 must contain information such as what type of compression procedure was used to compress the CCONT 414 and must also include other information necessary to allow the security client 420 to determine the location of certificate information when the contents are uncompressed. The extension used to contain such information must also be marked as critical such that if a relying party cannot interpret the extension, the certificate validation associated with the corresponding CRL will fail as specified, for example in accordance with RFC 3280, section 5.3. Alternatively, contents associated with each certificate can be compressed individually, whereupon the header information can be used to identify, for example, the locations of compressed records within CCONT 414.

The HDR 413 and the CCONT 414 are received as data object 421, which can be a data structure, data object, file or the like as will be appreciated. The security client 420 has the ability through block 430, which can be a processor, controller, or the like configured with additional processing blocks or units for handling data object 421. For example, the header portion of data object 421 can be read in block 431 whereupon it will be apparent that the contents portion of data object 421 are compressed. If the header contains additional information such as a location index of compressed contents, the block 430 can directly access portions of the compressed contents. The compressed contents are uncompressed in uncompression block 432 so that the revoked certificates can be identified and any transactions based on one or more of the revoked certificates can be handled accordingly by the security client 420 in accordance with PRI practice.

Figure 5:
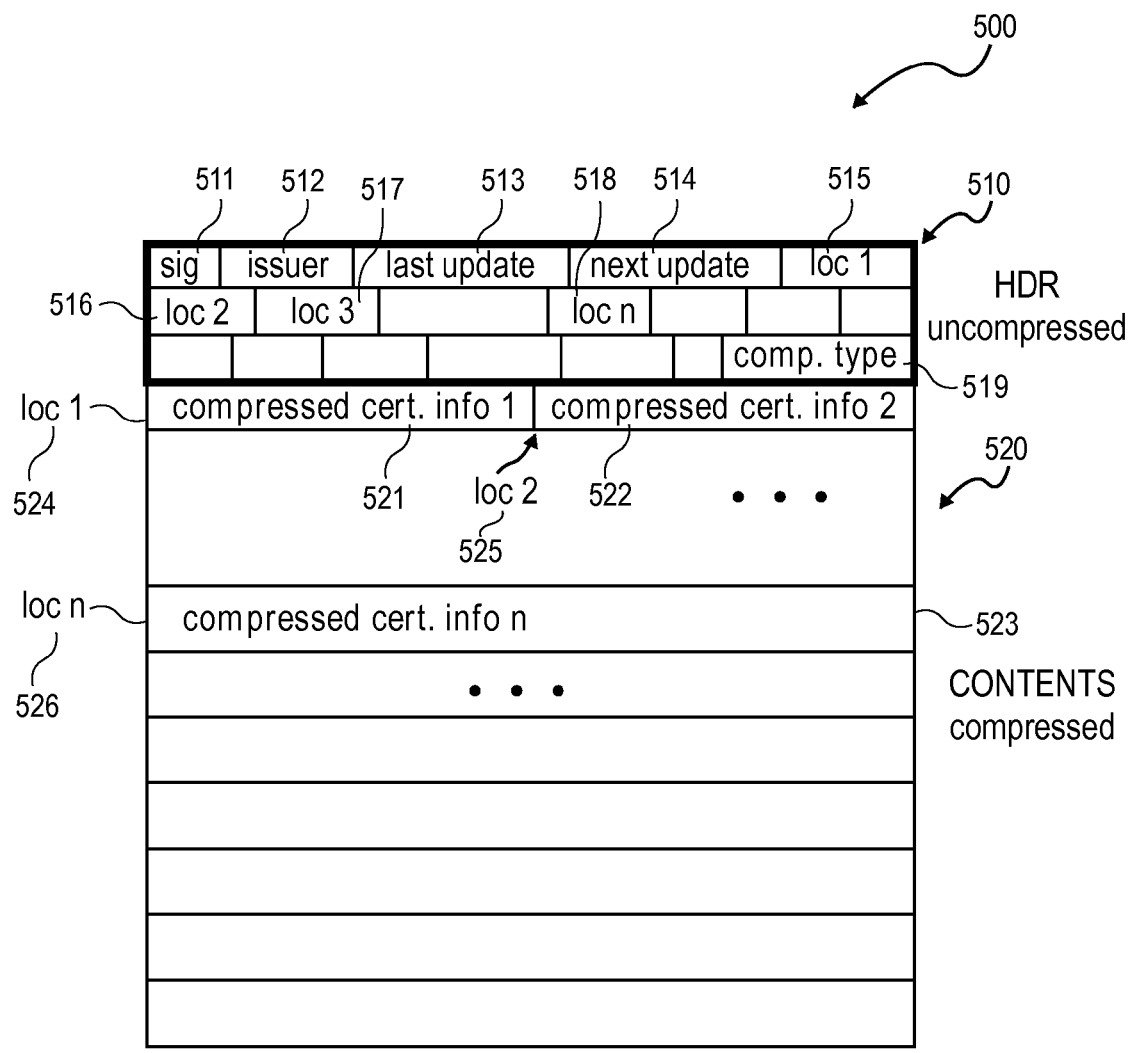
FIG. 5 is a diagram illustrating an exemplary header and compressed CRL contents in accordance with alternative embodiments of the present invention.

To better appreciate the possible contents of the exemplary HDR 413, FIG. 5, shows an exemplary combined data object in scenario 500, where an uncompressed HDR 510 and a compressed CONTENTS portion 520 are shown. It should be noted that the contents of CONTENTS portion 520 are preferably at least one or a sequence of compressed serial numbers and optionally other information associated with revoked certificates. The HDR 510 can contain normal information associated with the underlying CRL such as the signature 511, the issuer identity 512, the last update date 513, the next update date 514, and the like, including an indication of the kind of compression that is used. The HDR 510, in a simple illustrative embodiment where individual certificate information entries are compressed perhaps with a variable length, can include for example, location information of the individual entries such as loc 1 515 for the location of the first entry, loc 2 516 for the location of the second entry, loc 3 517 for the location of the third entry and so on, with loc n 518 representing the location of the $n^{th}$ entry. Correspondingly, the CONTENTS portion 520 contains a compressed entry associated with revoked certificate information such as a compressed certificate info, 1 521, a compressed certificate info, 2 522, and so on up to a compressed certificate info, n 523. The actual locations such as index locations of the compressed entries 521-523 associated with revoked certificate information is at loc 1 524, loc 2 525 and loc n 536. The HDR 510 can also include a compression type 519 to indicate the type of compression used in the CONTENTS portion 520.

Figure 6:
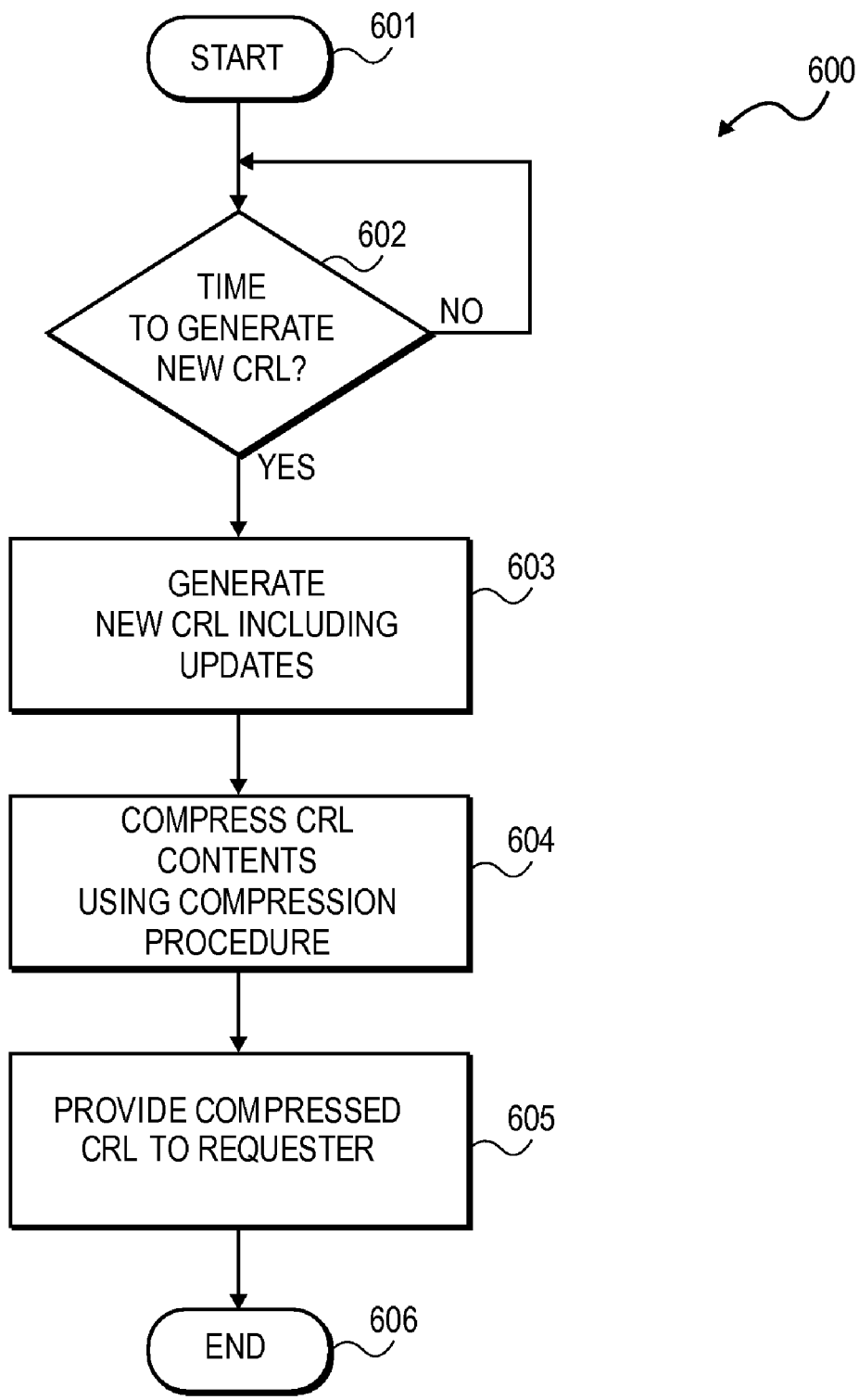
FIG. 6 is a flow chart illustrating an exemplary procedure for compressing a CRL in accordance with the present invention.

An exemplary scenario 600 shown in FIG. 6 shows various procedures that can be used to accomplish CRL compression in accordance with the invention. After start at 601, it can be determined at 602 whether an appropriate time has been reached for generation of a new CRL. Such a time could include a time reflected, for example, in the next update field or can be a time when a new certificate has been generated or the like. Such a time can also include when a specific request has been made by a security client for a CRL. If it is determined that a new CRL should be generated, then a new CRL can be generated at 603. It will be appreciated that, when referring to CRL, reference can be made in accordance with the present invention to a base CRL or a delta CRL. In the case where a delta CRL is generated or requested, it should be assumed that a recipient or a requester, such as an exemplary security client, also has previously requested and has the corresponding base CRL. After the CRL is generated, that is, after all the information for the certificates that have been revoked since the generation of the last update, the CRL can be compressed entirely at 604 using a compression procedure such as a lossless compression procedure as described above. The CRL can then be provided to a security client over a connection such as a network connection at 605 based on a request or, alternatively based on a periodic schedule such as that reflected in the last update/next update fields. While the exemplary procedure is indicated as ending at 606, it will be appreciated that all or portions of the procedure can be performed or repeated on an as-needed basis depending, for example, on the number of certificates revoked, the frequency of revocation and the like.

Figure 7:
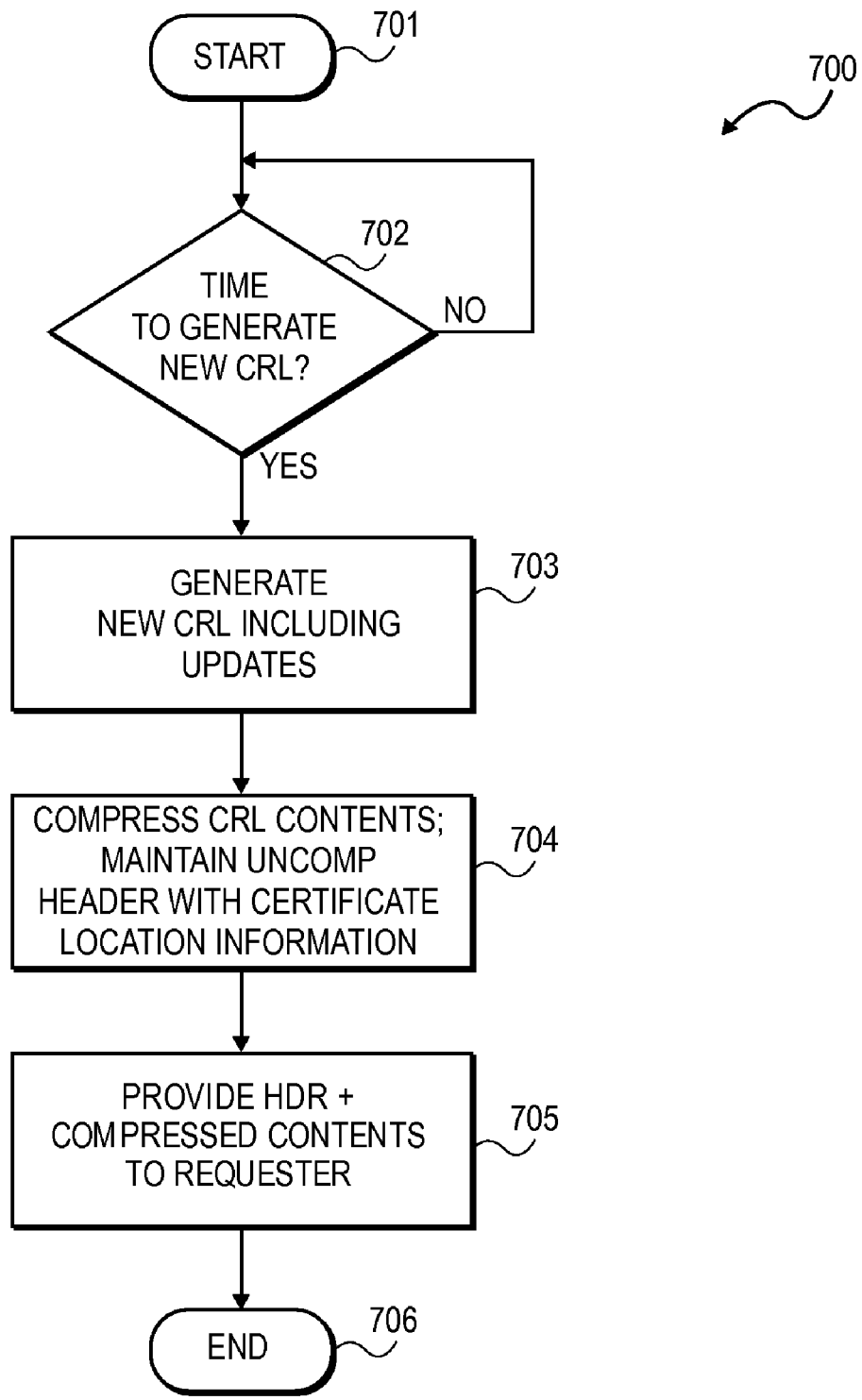
FIG. 7 is a flow chart illustrating an exemplary procedure for compressing CRL contents and maintaining an uncompressed header in accordance with the present invention.

In connection with embodiments involving the compression of CRL contents and maintenance of a header, an exemplary scenario 700 is shown in FIG. 7 with various procedures for accomplishing such compression. After start at 701, it can be determined, for example, at 702 whether an appropriate time has been reached for generation of a new CRL. As noted above, the time to generate a new CRL could include a time reflected, for example, in the next update field or can be a time when a new certificate has been generated or the like. Such a time can also include when a specific request has been made by a security client for a CRL. If it is determined that a new CRL should be generated, then a new CRL can be generated at 703. When referring to CRL, as previously noted, reference can be made in accordance with the present invention to a base CRL or a delta CRL. In the case where a delta CRL is generated or requested, it should be assumed that a recipient or a requester, such as an exemplary security client, also has previously requested and has the corresponding base CRL.

After the CRL is generated, that is, after all the information for the certificates that have been revoked since the generation of the last update is generated, the CRL contents can be compressed at 704 using a compression procedure such as lossless compression procedure as described above and a header can be generated and maintained in an uncompressed form. The header can include at least an indication that the contents are compressed and the type of compression used for example in embodiments where the contents are compressed in their entirety. In other embodiments where individual certificate serial numbers and information associated with the certificates such as certificate extensions as described above are separately compressed, the header can contain a location index of the records within the compressed portion of the CRL. The combination of the header and the compressed contents of the CRL can then be provided to a security client at 705 based on a request or, alternatively based on a periodic schedule such as that reflected in the last update/next update fields. While the exemplary procedure is indicated as ending at 706, it will be appreciated that all or portions of the procedure can be performed or repeated on an as-needed basis depending, for example, on the number of certificates revoked, the frequency of revocation and the like.

Figure 8:
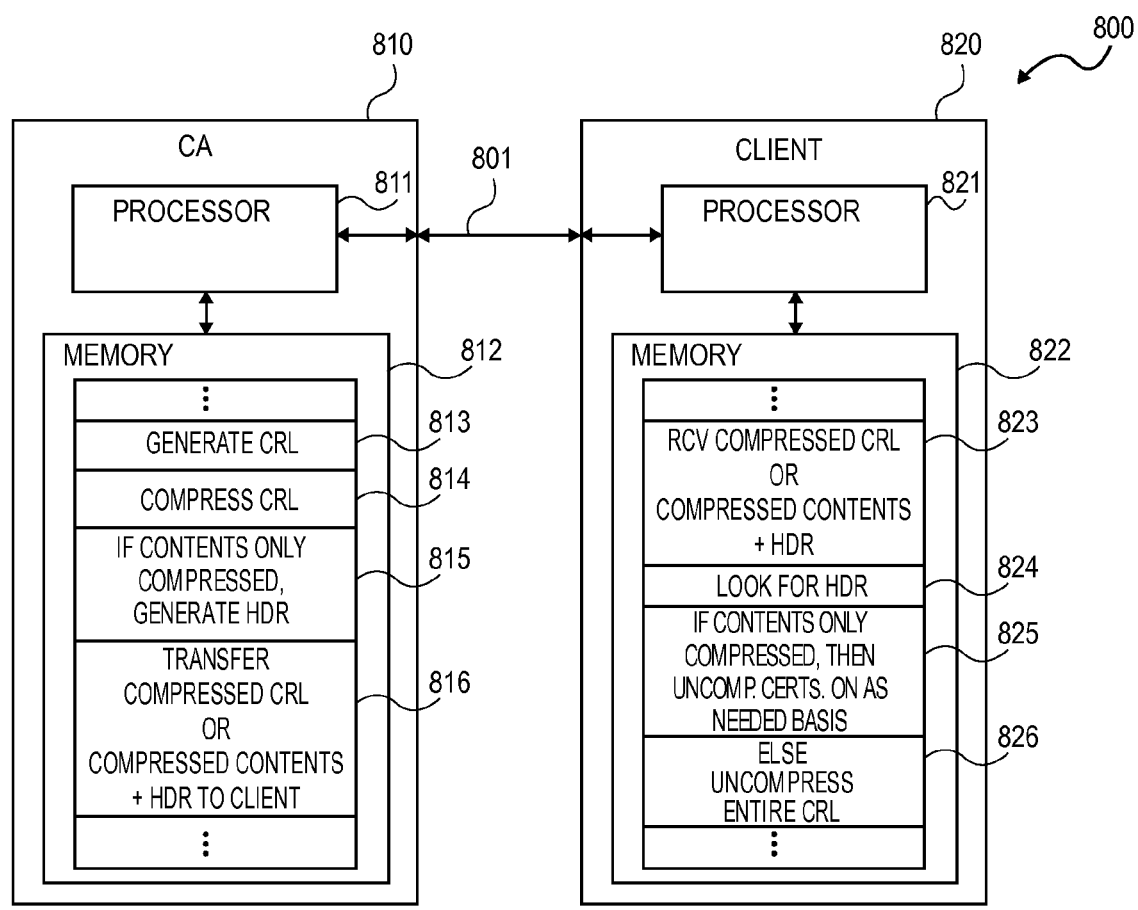
FIG. 8 is a block diagram illustrating portions of an exemplary CA and an exemplary client.

It will be appreciated by those of ordinary skill that the present invention can be embodied, for example in scenario 800 as shown in FIG. 8, as one or more general purpose computer systems or dedicated computer systems having one or more processors, and memory or the like. The certificate authority (CA) 810 and client 820 can be connected with a link 801, such as a network connection. In various exemplary and alternative exemplary embodiments, the link 801 can include a connection from CA 810 to client 820, through a public network such as the Internet. Further, CA 810 can be linked through a public network to client 820 which may be associated with a private network. The link 801 can further be wired or wireless as will be appreciated or can be any combination of known methods to link a client and server. It will also be appreciated that the CA 810 and the client 820 may be equipped with network interface hardware (not shown) such as a network interface controller (NIC) or other circuit or device for providing connectivity. Still further, a higher layer, basic security for the connection associated with link 801 can be facilitated, by the use of secure sockets layer (SSL) as would be appreciated.

In the exemplary scenario 800, the CA 810 and the client 820 can be loaded with software instructions, for example, in respective memory 812 and memory 822, for causing respective processors 811 and 821 to carry out various procedures in accordance with the invention. For example, CA 810 can execute instructions in the memory 811 to generate a CRL at 813 according to a schedule or request as described above. The CRL can be compressed at 814 and, if the contents only are being compressed at 815, a header can be generated. The compressed CRL or the compressed contents including an uncompressed header can be transferred at 816 to client 810, which can be for example a personal security environment (PSE) or the like. The client 820 can received the compressed CRL or the compressed CRL contents and uncompressed header at 822 and immediately look for the header. The compressed CRL contents include a compressed certificate serial numbers and optional extensions associated with revoked certificates. It will be appreciated that in the case where the entire CRL is compressed, an indication should be provided to the client 820 that the CRL is compressed and the method of compression. Alternatively, the manner of compression can be known in advance. For example, CA 810 can provide an indication in its own certificate that it will be sending CRL in a compressed format and further indicate the type of compression used. One of ordinary skill will realize the additional security can be inherently provided by transferring a compressed CRL where the fact that the CRL is compressed and the manner of compression can only be known through legitimately obtaining a certificate from the CA 810.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of compressing a certificate revocation list (CRL) in a computer system having a certification authority (CA), the method comprising:
   accessing the CRL, wherein the CRL comprises at least one certificate revocation record (CRR) associated with a revoked certificate;
   compressing the at least one CRR by compressing a serial number of the revoked certificate and at least one certificate extension associated with the revoked certificate based on a lossless compression procedure that performs at least one of entropy encoding or dictionary encoding;
   storing the compressed at least one CRR in a body portion of a compressed CRL associated with the CA; and
   modifying a header portion of the compressed CRL to indicate that the body portion of the CRL is compressed, the modifying comprising generating a location index in the header portion of the compressed CRL, the location index indicating a location of the compressed at least one CRR in the body portion, wherein the header portion of the compressed CRL is uncompressed and the body portion of the compressed CRL is compressed.

2. The method of claim 1, further comprising:
   receiving a request for the compressed CRL from a security client; and
   providing the compressed CRL to the security client for decompression to form an uncompressed CRL.

3. The method of claim 1, further comprising:
   receiving a request for the compressed CRL from a security client;
   decompressing the compressed CRL to form an uncompressed CRL; and
   providing the uncompressed CRL to the security client.

4. The method of claim 1, wherein the compression comprises one or more of a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure and a Lempel-Ziv-Welch (LZW) compression procedure.

5. The method of claim 1, further comprising:
   receiving a request for the compressed CRL from a security client; and
   providing the compressed CRL to the security client, wherein the security client reads the header portion to determine that the requested compressed CRL is the compressed CRL and decompresses the compressed CRL to form an uncompressed CRL.

6. The method of claim 1, wherein the at least one CRR comprises the serial number of the revoked certificate, a reason for revocation, and an invalidity date.

7. The method of claim 1, wherein the at least one certificate extension comprises one of an authority key identifier, an issuer alternative name, and a certificate issuer.

8. The method of claim 1, wherein the CRL comprises one or more fields comprising a version field, a CRL number field, an issuing distribution point field, a delta CRL indicator field, a reason code field, a signature field, an issuer field, a present update date field, a next update date field, and a certificate revocation record field.

9. The method of claim 1, wherein the CRL comprises an X.509 CRL and the revoked certificate comprises an X.509 certificate.

10. An apparatus configured to perform the method of claim 1.

11. A computer readable medium comprising computer executable instructions for causing a computer to perform the method of claim 1.

12. A method of processing a compressed certificate revocation list (CRL) in a computer system having a certification authority (CA), the method comprising:
    receiving the compressed CRL at a security client, wherein the compressed CRL comprises an uncompressed header portion and a compressed body portion;
    identifying contents of the compressed CRL comprising at least one compressed certificate revocation record (CRR) associated with a revoked certificate, wherein the at least one compressed CRR comprises at least one certificate extension;
    identifying, from a location index in the header portion of the CRL, a location of the at least one CRR in the body portion of the CRL;
    decompressing the contents of the compressed CRL in the security client to form uncompressed CRL contents by decompressing a serial number of the revoked certificate stored at the location, wherein the serial number was compressed by a lossless compression procedure that performs at least one of entropy encoding or dictionary encoding; and
    storing the uncompressed CRL contents in the security client.

13. The method of claim 12, wherein the CRL is compressed via one or more of a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure and a Lempel-Ziv-Welch (LZW) compression procedure.

14. The method of claim 12, wherein the CRL comprises an X.509 CRL and the revoked certificate comprises an X.509 certificate.

15. An apparatus configured to perform the method of claim 12.

16. A computer readable medium comprising computer executable instructions for causing a computer to perform the method of claim 12.

17. A certificate server configured to compress a certificate revocation list (CRL) in a computer system having a certification authority (CA), the certificate server comprising:
    a secure network interface;
    a storage device storing the CRL; and
    a processor coupled to the storage device and the secure network interface, the processor configured to:
       access the CRL, wherein the CRL comprises at least one certificate revocation record (CRR) associated with a revoked certificate;
       compress the at least one CRR by compressing a serial number of the revoked certificate and at least one certificate extension associated with the revoked certificate based on a lossless compression procedure that performs at least one of entropy encoding or dictionary encoding;

store the compressed at least one CRR in a body portion of a compressed CRL associated with the CA; and modify a header portion of the compressed CRL to indicate that the body portion of the CRL is compressed, the modifying comprising generating a location index in the header portion of the compressed CRL, the location index indicating a location of the compressed at least one CRR in the body portion, wherein the header portion of the compressed CRL is uncompressed and the body portion of the compressed CRL is compressed.

18. The certificate server of claim 17, wherein the processor is further configured to:

receive a request for the compressed CRL over the secure network interface from a security client; and provide the compressed CRL to the security client over the secure network interface for decompression to form an uncompressed CRL.

19. The certificate server of claim 17, wherein the processor is further configured to:

receive a request for the compressed CRL over the secure network interface from a security client;

decompress the compressed CRL to form an uncompressed CRL; and provide the uncompressed CRL to the security client over the secure network interface.

20. The certificate server of claim 17, wherein the compression comprises one or more of a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure and a Lempel-Ziv-Welch (LZW) compression procedure.

21. The certificate server of claim 17, wherein the at least one CRR comprises the serial number of the revoked certificate, a reason for revocation, and an invalidity date.

22. The certificate server of claim 17, wherein the certificate extension comprises one of an authority key identifier, an issuer alternative name, and a certificate issuer.

23. The certificate server of claim 17, wherein the CRL comprises one or more fields comprising a version field, a CRL number field, an issuing distribution point field, a delta CRL indicator field, a reason code field, a signature field, an issuer field, a present update date field, a next update date field, and a certificate revocation record field.

24. The certificate server of claim 17, wherein the CRL comprises an X.509 CRL and the revoked certificate comprises an X.509 certificate.

25. A security client for processing a compressed certificate revocation list (CRL) in a computer system including at least a certification authority (CA), the security client comprising:

a network interface;

a storage device; and a security client processor coupled to the storage device and the network interface, the security processor configured to:

receive the compressed CRL from the CA, wherein the compressed CRL comprises an uncompressed header portion and a compressed body portion;

identify contents of the compressed CRL comprising at least one compressed certificate revocation record (CRR) associated with a revoked certificate, wherein the at least one compressed CRR comprises at least one certificate extension;

identify, from a location index in the header portion of the CRL, a location of the at least one CRR in the body portion of the CRL;

decompress the contents of the compressed CRL to form uncompressed CRL contents by decompressing a serial number of the revoked certificate stored at the location, wherein the serial number was compressed by a lossless compression procedure that performs at least one of entropy encoding or dictionary encoding; and store the uncompressed CRL contents in the storage device.

26. The security client of claim 25, wherein the CRL is compressed via one or more of a Burrows-Wheeler block sorting compression procedure, a Huffman coding compression procedure, an arithmetic coding compression procedure, a sliding window compression procedure, a Lempel-Ziv 1977 (LZ77) compression procedure, a Lempel-Ziv 1978 (LZ78) compression procedure and a Lempel-Ziv-Welch (LZVV) compression procedure.

27. The security client of claim 25, wherein the certificate extension comprising one of an authority key identifier, an issuer alternative name, a CRL number, an issuing distribution point, a delta CRL indicator, a reason code, a certificate issuer, a reason for revocation, and an invalidity date.

28. The security client of claim 25, wherein the CRL comprises one or more fields including one or more of a version field, a signature field, an issuer field, a present update date field, a next update date field, and a revoked certificates field.

29. The security client of claim 25, wherein the CRL comprises an X.509 CRL and the revoked certificate comprises an X.509 certificate.

* * * * *